Aug. 16, 1966     D. I. BROOK     3,266,460
MACHINE FOR PROCESSING TUBULAR GOODS
Filed March 25, 1963     2 Sheets-Sheet 2
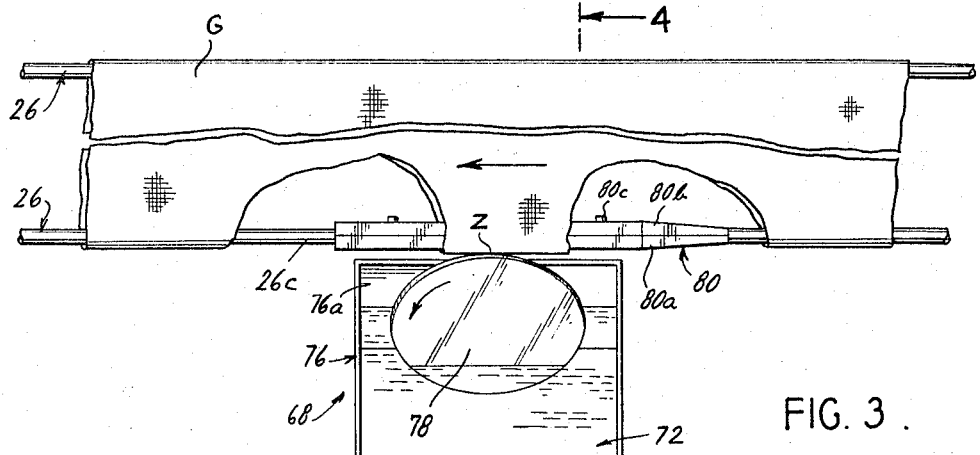
FIG. 3.
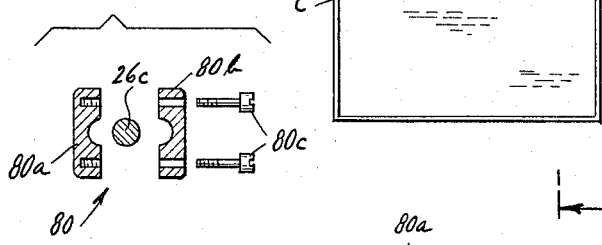
FIG. 5.
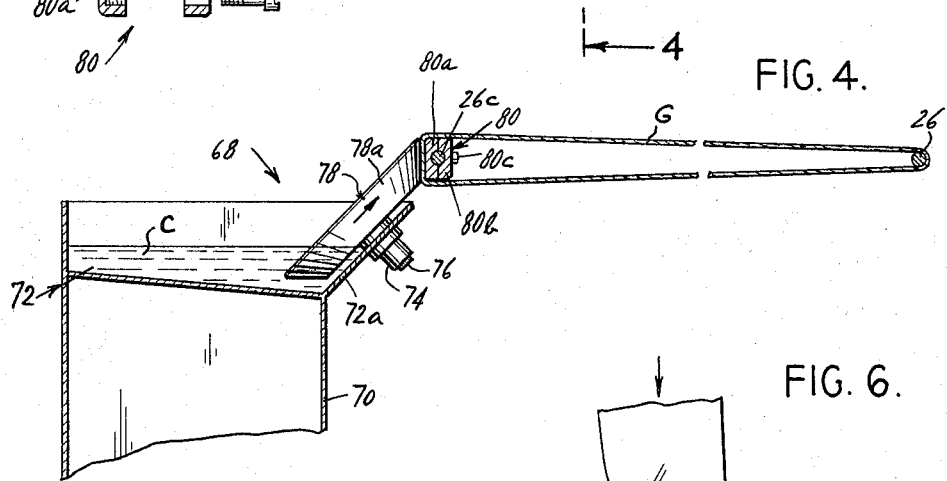
FIG. 4.
FIG. 6.
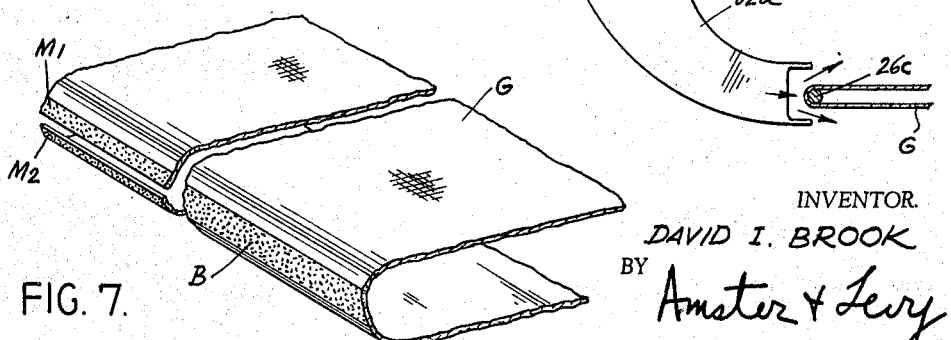
FIG. 7.
INVENTOR.
DAVID I. BROOK
BY Amster & Levy
ATTORNEYS united States Patent Office 3,266,460
Patented August 16, 1966

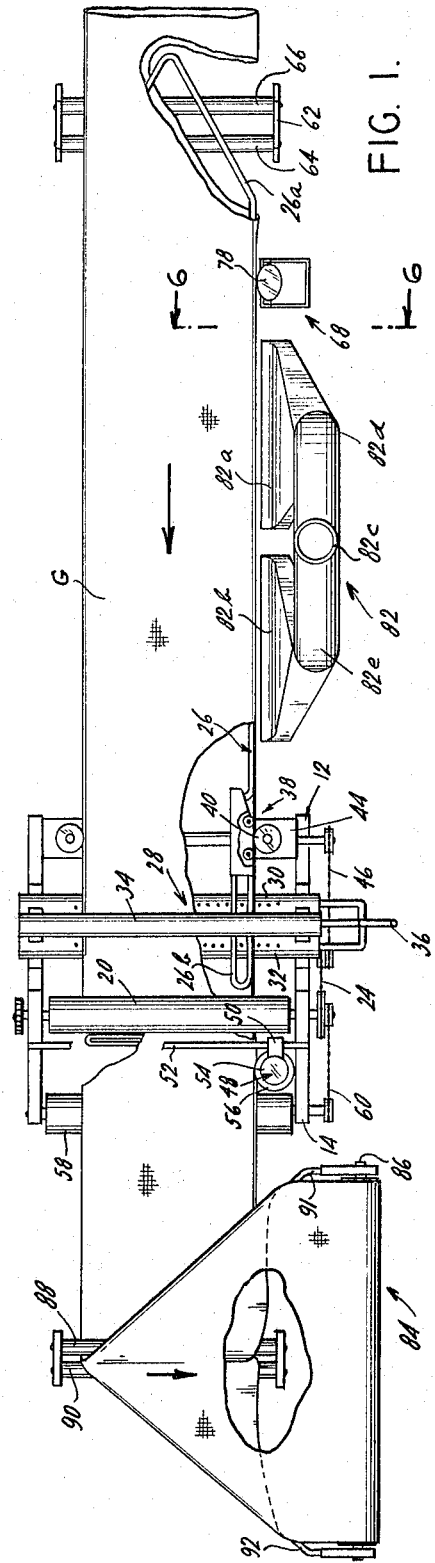
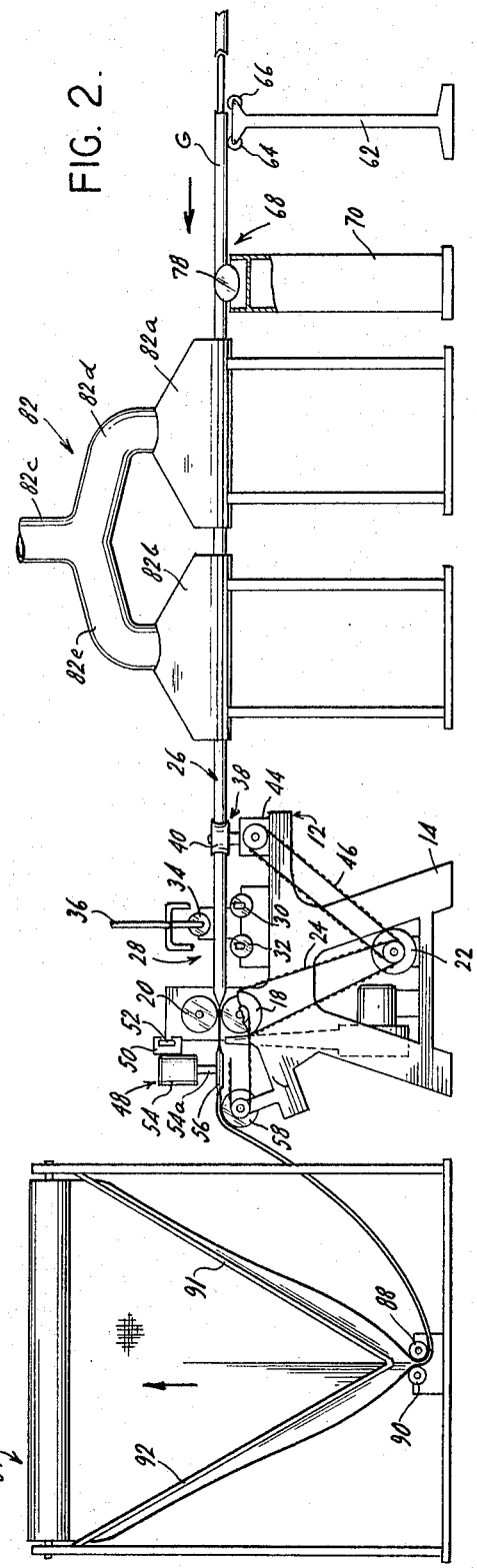

3,266,460
MACHINE FOR PROCESSING TUBULAR GOODS
David I. Brook, 92 Robby Lane, New Hyde Park, N.Y.
Filed Mar. 25, 1963, Ser. No. 267,480
9 Claims. (Cl. 118—38)

The present invention relates generally to a machine for processing tubular goods, and in particular to apparatus for finishing tubular goods and then slitting the goods along one side such that the same may be spread and rewound in the full width.

Tubular goods are usually finished by passing the same through a steaming zone or chamber, followed by the calendering of the goods, as by passing the same between the opposed rollers. As the goods emerge from the opposed calendering rollers, provision is made for slitting the same along one side edge whereupon the goods are spread to their full width and taken up on an appropriate rewind. Various techniques have been suggested for slitting the tubular goods along its length in a manner to preclude raveling and to provide substantially curl-free selvages. However, with commercially available equipment, it has not been practical to continuously process large quantities of tubular goods on a continuous basis and with minimum supervisory personnel.

Broadly, it is an object of the present invention to provide improved apparatus for finishing tubular goods. Specifically, it is within the contemplation of the invention to provide a machine wherein tubular goods may be steamed, calendered and slit on a continuous basis such that the goods, after slitting, may be spread to its full width and have substantially ravel and curl-free selvages or margins.

In accordance with an illustrative embodiment demonstrating objects and features of the present invention there is provided a machine for processing tubular goods which comprises a pair of calendering rollers which are disposed one above the other and rotatable about spaced axes. Drive means are operatively connected to the calendering rollers for rotating the same about their respective axes. An elongated mandrel extends along a longitudinal feed path and is directed toward and terminating at the calendering rollers and has opposite sides adapted to engage said tubular goods and to distend the same. A coating applicator which is adapted to dispense a resin-solvent suspension is disposed along one side of the feeding path adjacent side of the mandrel and at an applicating zone in advance of the calendering rollers for applying a band of the coating material along the adjacent side of the tubular goods. Provision is made along the one side of the feeding path and the adjacent side of the mandrel between the applicating zone and the calendering rollers to establish a drying zone including at least one air outlet nozzle which is directed towards the one side of the mandrel to pass a stream of air over the band of coating material for drying the same in advance of the calendering rollers. A slitter is disposed to the one side of the feeding path following the calendering rollers and is arranged to engage the adjacent side of the tubular goods substantially medially of the band such that the goods may be slit and spread to full width.

The above brief description, as well as further objects, features and advantages of the present invention will be more fully appreciated by reference to the following detailed description of a presently preferred, but nonetheless illustrative embodiment in accordance with the present invention, when taken in conjunction with the accompanying drawings, wherein:

FIG. 1 is a plan view of a finishing machine embodying features of the present invention, shown with a length of tubular goods threaded therethrough, with portions of the tubular goods being broken away to show constructional details of the machine;

FIG. 2 is a side elevational view of the finishing machine;

FIG. 3 is an enlarged fragmentary plan view at the applicating zone or station of the finishing machine;

FIG. 4 is a sectional view taken substantially along the line 4—4 of FIG. 3 and looking in the direction of the arrows, with parts being broken away and sectioned;

FIG. 5 is an exploded view, partially in section and taken transversely of the side of the mandrel contiguous to the applicating zone or station;

FIG. 6 is a fragmentary sectional view taken substantially along the line 6—6 of FIG. 1 and looking in the direction of the arrows, showing details of the apparatus at the drying zone or station; and, FIG. 7 is a fragmentary perspective view of the tubular goods, with parts broken away and section showing the condition of the goods in advance of and following the slitter.

Referring now specifically to the drawings, there is shown a machine, generally designated by the reference numeral 10, suitable for the finishing of tubular goods, such as those produced by circular knitting machines. The finishing machine 10 includes a frame 12 which has opposite sides 14, 16. A pair of calender rollers 18, 20 are disposed one above the other and are rotatably mounted on the opposite side 14, 16 to rotate about spaced horizontal axes. Mounted on the machine frame contiguous to the side 14 is a main drive motor 22 which is connected by an appropriate chain and sprocket coupling 24 to the lower calendering roller 18 for imparting rotary movement thereto in the counterclockwise direction, when viewed from the side of the machine as illustrated in FIG. 2, to advance the tubular goods G through the machine from right to left.

Extending forwardly of the machine substantially in the horizontal plane defined by the location of the nip or peripheral contact between the calendering rollers 18, 20 is an elongated mandrel 26 which extends along a horizontal feed path and includes a V-shape leading end 26a disposed at a location removed from the calendering rollers 18, 20 and having a terminal end 26b extending to a location contiguous to the rollers 18, 20. The elongated mandrel 26 is fabricated in accordance with generally know techniques and is arranged to distend or laterally stretch the tubular goods G to form superposed top and bottom half sections which are wrapped about the opposite sides of the mandrel 26.

In advance of the calendering rollers 18, 20, there is provided a steaming zone or station, generally designated by the reference numeral 28, which is arranged to direct jets of steam to the top and bottom half sections of the tubular goods G prior to calendering. The apparatus at the steaming zone or station 28 includes, in this illustrative embodiment, a pair of lower cylindrical steam heads 30, 32 which are mounted between the opposite sides 14, 16 of the frame 12 and includes outlet nozzles or apertures directed upwardly and an upper cylindrical steam head 34 which likewise extends from side to side of the machine and includes downwardly directed outlet nozzles or apertures. Appropriate piping, generally designated by the reference numeral 36, is connected to a source of steam under pressure and to the lower and upper heads 30, 32, 34 for introducing steam under pressure to the heads for establishment of the steaming zone 28 in advance of the calendering rollers 18, 20.

A feeding mechanism, generally designated by the reference numeral 38, is arranged in advance of the steaming zone 28 and contiguous to the opposite sides of the mandrel 26 for advancing the tubular goods along the feed path through the steaming zone 28 and through the calendering rollers 18, 20. In this illustrative embodiment, the feeding mechanism includes a pair of feeding rollers 40, 42 which are journalled on opposite sides of the mandrel 26 to rotate about respective vertical axes, with the peripheral surfaces of the rollers 40, 42 being contoured to engage the tubular material which is wrapped about the adjacent sides of the mandrel 26. The feeding roller 42 is an idler roller. As seen in FIG. 2, the feeding roller 40 is connected via speed reduction gearing 44 and the chain and sprocket coupling 46 to the main drive motor 22.

Disposed to one side of the feed path and substantially in longitudinal alignment with the adjacent side of the mandrel 26 is a slitter, which is generally designated by the reference numeral 48. The slitter 48 follows the calendering rollers 18, 20 and is arranged to engage the adjacent side of the tubular goods G such that the goods may be slit and spread to its full width. The slitter 48 includes a mounting bracket 50 slidably mounted on a cross bar 52 for adjustably securing the same at various locations across the width of the machine. The mounting bracket 50 supports a relatively high speed knife-driving motor 54 which carries on its depending output shaft 54a a horizontally disposed circular slitting knife 56. The circular slitting edge of the knife 56 is arranged in the horizontal plane of the mandrel 26 and at a lateral location to engage the adjacent side of the tubular goods after the same emerges from the calendering rollers 18, 20. Suitable provision is made to guide the tubular goods to the knife 56 to assure the continuous slitting of the goods along the side adjacent to the slitter 48.

Following the slitter 48 and extending across the width of the machine is a takeoff roller 58 which is journalled on the sides 14, 16 such that its uppermost peripheral portion is disposed substantially in the plane of the slitting knife 56. The takeoff roller 58 is driven from the main drive motor 22 by coupling the same via the chain and sprocket 60 to the lower driven calendering roller 18, as seen best in FIG. 2.

The V-shaped leading end 26a of the mandrel 26 is approximately supported in any convenient fashion, as by the provision of the supporting stand 62 which includes roller 64, 66 journalled for rotation about spaced horizontal axes extending transverse of the mandrel 26 and underlying the same, as seen to the right in FIGS. 1 and 2. It will be appreciated that the tubular goods G may be fed over the leading end 26a of the mandrel from any appropriate supply, such as a receptacle in which the tubular goods are folded or a feeding stand upon which the goods are rolled up.

Spaced from the supporting stand 62 in the direction of travel on the goods, is a coating applicator 68 which is disposed along the same side of the mandrel as the rotary knife slitter 48 and well in advance of the calendering rollers 18, 20 for applying a band B (see FIG. 7) of coating material along the adjacent side of the tubular goods G. The band B may be of any appropriate resin-solvent suspension, which will rapidly air dry and will impart sufficient body to the tubular goods to facilitate slitting and thereafter provide curl and ravel free margins or selvages $M_1$, $M_2$. As seen best in FIGS. 2 to 4 inclusive, the applicator 68 includes a standard 70 which may be fabricated of sheet metal or the like and is formed at its end with a receptacle 72 which is adapted to receive a supply of the coating material C. The receptacle 72 includes a large open mouth to facilitate the filling thereof and is formed with a side wall 72a which is inclined at an acute angle to the horizontal and directed upwardly towards the adjacent side 26c of the mandrel 26. Set into the inclined side wall 72a is an appropriate bearing or hub 74 for an applicator wheel 78 which is journalled for rotation on a stub shaft 76 which extends at right angles to the inclined wall 72a and at approximately 45° to the horizontal. The applicator wheel 78 which is journalled to be relatively free turning has a frusto-conical applicator face 78a which is successively rotated through the supply of coating material C and is arranged such that the applicator face is disposed substantially vertically in an applicating zone contiguous to and confronting the side 26c of the mandrel 26. In order to present a planar backing surface within the tubular goods G confronting the vertically-extending peripheral segment of the applicator face 78a and to assure the provision of a band B of uniform width and coverage on the goods G, an adaptor 80 is secured to the adjacent side 26c of the mandrel 26. The adaptor 80 includes two longitudinally extending half sections 80a, 80b (see FIG. 5) which are adapted to embrace the circular side 26c of the mandrel 26 and are secured thereto by one or more machine bolts 80c. The adaptor, as seen in FIG. 3, is appropriately configured such as not to present a sharp discontinuity to the goods G as it passes along the mandrel 26.

Disposed along the side 26c of the mandrel 26 intermediate the applicator 68 and the steaming zone 28 is apparatus, generally designated by the reference numeral 82, for establishing a drying zone which is effective to dry the band B of coating material preliminary to contact thereof by the feeding roller 40 and advance through the steaming zone 28 and the calendering rollers 18, 20. The drying apparatus 82 includes a pair of air outlet nozzles 82a, 82b which has their exit ends arranged to direct a stream of air at the band B of coating material applied to the mandrel G, as seen best in FIG. 6. The width of the nozzles 82a, 82b measured along the length of the mandrel 26 is such as to adequately dry the coating material to set up a slitting region which, when medially slit, will make-up the selvages or margins $M_1$, $M_2$ (see FIG. 7). An inlet duct 82c is connected via branch ducts 82d, 82e to the nozzles 82a, 82b to provide hot air from any appropriate source to the nozzles for impingement against the adjacent side of the tubular goods.

Trailing the main unit of the machine 10 which provides for the steaming, calendering and slitting, is a spreader, generally designated by the reference numeral 84, which includes a rewind shaft 86 on which the goods, when spread to full width may be rolled up. The rewind shaft 86 may be driven in any convenient fashion, as is generally understood. The rewind shaft 86 of the spreader 84 is arranged to receive the goods after the same passes from the takeoff roller 58 in double, but slit condition. The doubled goods passes between the guide rollers 88, 90 and about V-shaped spreader bars 91, 92 and then is wound up in its full width, as is generally understood.

In actual use, the operator takes the leading end of the tubular goods G and passes the same over the mandrel M between the lower and upper steaming heads 30, 32 and 34, through the calendering rollers 18, 20 and advances the same past the slitting knife 56 of the slitter 48. The machine is placed into operation for a sufficiently long period to enable the operator to thread the slit, but folded goods through the spreader 84 and attach the same to the rewind shaft 86. With appropriate initial adjustments of the resin to solvent ratio of the coating material C, the temperature of the hot air directed to the adjacent edge of the goods by the nozzles 82a, 82b and other parameters within the machine, the operator then can place the machine into operation on an automatic basis and thereby finish goods at a relatively rapid rate, with minimum necessity for supervision. The resulting goods is finished to full width, with both of the edges being secured against ravelling and providing curl-free margins which facilitate further processing, handling and cutting of the tubular goods.

What I claim is:

1. A machine for processing tubular goods comprising a pair of substantially horizontal calendering rollers disposed one above the other and rotatable about spaced axes, said calendering rollers defining a goods-receiving nip therebetween, drive means operatively connected to said calendering rollers for rotating the same, an elongated and substantially flat mandrel extending along a longitudinal feed path and directed toward and terminating at said nip of said calendering rollers and having opposite sides adapted to engage said tubular goods and distend the same, a coating applicator disposed along one side of said feed path and the corresponding one side of said mandrel at an applicating zone in advance of said calendering rollers for applying a band of coating material along the adjacent side of said tubular goods, means providing an elongated drying zone along said one side of said feed path and said mandrel intermediate said applicating zone and said calendering rollers and including at least one elongated air outlet nozzle directed toward said one side of said mandrel, and a slitter disposed to said one side of said feed path following said calendering rollers and arranged to engage the adjacent side of said tubular goods substantially medially of said band such that said goods may be slit and spread to full width.

2. A machine according to claim 1 wherein said applicator includes a receptacle adapted to receive a supply of coating material and including at least one wall which is inclined at an acute angle to the horizontal and directed upwardly toward said one side of said mandrel, and an applicator wheel freely journaled on said one wall and having a frustoconical face projecting above said one wall, said one wall and said applicator wheel being arranged such that said face is disposed substantially vertically in said applicating zone contiguous to and confronting said one side of said mandrel.

3. A machine according to claim 2 wherein said mandrel includes means providing a vertically extending backing member disposed contiguous to and confronting said face of said applicator wheel in said applicating zone to accurately guide said tubular goods during passage through said applicating zone.

4. A machine for processing tubular goods comprising a pair of calendering rollers disposed one above the other and rotatable about spaced horizontal axes, said calendering rollers defining a goods-receiving nip therebetween, drive means operatively connected to said calendering rollers for rotating the same, an elongated mandrel extending along a longitudinal feed path and directed toward and terminating at said nip of said calendering rollers and having opposite sides adapted to engage said tubular goods and distend the same, means providing a steaming zone in advance of said calendering rollers and above and below said mandrel, a coating applicator disposed along one side of said feed path and the corresponding one side of said mandrel at an applicating zone in advance of said steaming zone and including an applicator wheel disposed adjacent to said one side of said feed path and directed toward said mandrel for applying a band of coating material along the adjacent side of said tubular goods, means providing an elongated drying zone along said one side of said feed path and said mandrel intermediate said applicating zone and said steaming zone and including at least one elongated air outlet nozzle directed toward said one side of said mandrel, a slitter disposed to said one side of said feed path following said calendering rollers and arranged to engage the adjacent side of said tubular goods substantially medially of said band such that said goods may be slit and spread to full width, and a spreader arranged to receive said goods after slitting and including means for spreading and rolling up said goods.

5. A machine according to claim 4 wherein said applicator includes a receptacle adapted to receive a supply of coating material and including at least one wall which is inclined at an acute angle to the horizontal and directed upwardly toward said one side of said mandrel, said applicator wheel being freely journaled on said one wall and having a frusto-conical face projecting above said one wall, said one wall and said applicator wheel being arranged such that said face is disposed substantially vertically in said applicating zone contiguous to and confronting said one side of said mandrel.

6. A machine for processing tubular goods comprising a pair of calendering rollers disposed one above the other and rotatable about spaced horizontal axes, said calendering rollers defining a goods-receiving nip therebetween, a drive operatively connected to said calendering rollers for rotating the same, an elongated mandrel extending along a longitudinal feed path and directed toward and terminating at said nip of said calendering rollers and having opposite sides adapted to engage said tubular goods and distend the same, means providing a steaming zone in advance of said calendering rollers and above and below said mandrel, a coating applicator disposed along one side of said feed path and said mandrel at an applicating zone in advance of the corresponding one side of said steaming zone for applying a band of coating material along the adjacent side of said tubular goods, means providing an elongated drying zone along said one side of said feed path and said mandrel intermediate said applicating zone and said steaming zone and including at least one elongated air outlet nozzle directed toward said one side of said mandrel, a slitter disposed to said one side of said feed path following said calendering rollers and arranged to engage the adjacent side of said tubular goods substantially medially of said band such that said goods may be slit and spread to full width, and a feeding mechanism arranged in advance of said steaming zone and contiguous to said mandrel for moving said tubular goods along said feed path.

7. A machine according to claim 6 wherein said feeding mechanism includes a pair of feeding rollers disposed at opposite sides of said mandrel and arranged to make contact with said tubular goods, and means operatively connected to said drive for rotating at least one of said feeding rollers.

8. A machine according to claim 6 wherein said slitter includes a horizontally extending circular slitting knife journaled for rotation about a vertical axis and a knife-driving motor operatively connected to said slitting knife.

9. A machine according to claim 6 wherein said applicator includes a receptacle adapted to receive a supply of coating material and including at least one wall which is inclined at an acute angle to the horizontal and directed upwardly toward said one side of said mandrel, and an applicator wheel freely journaled on said one wall and having a frusto-conical face projecting above said one wall, said one wall and said applicator wheel being arranged such that said face is disposed substantially vertically in an applicating zone contiguous to and confronting said one side of said mandrel.

References Cited by the Examiner

UNITED STATES PATENTS

| | | | |
|---|---|---|---|
| 1,323,212 | 11/1919 | Bulley | 26—55 |
| 1,964,691 | 6/1934 | Shippling | 118—38 |
| 2,349,245 | 5/1944 | Campbell | 118—211 |
| 2,852,407 | 9/1958 | Wood et al. | 117—7 X |
| 2,880,114 | 3/1959 | Cohn et al. | 117—7 X |
| 3,001,505 | 9/1961 | Novick | 118—244 X |
| 3,105,283 | 10/1963 | Pernick | 26—55 |

CHARLES A. WILLMUTH, *Primary Examiner.*

L. G. MACHLIN, *Assistant Examiner.*